(12) United States Patent
Asada

(10) Patent No.: US 6,554,488 B2
(45) Date of Patent: Apr. 29, 2003

(54) OPTICAL FIBER END PROCESSING METHOD AND OPTICAL FIBER END PROCESSING EQUIPMENT

(75) Inventor: Kazuhiro Asada, Nagoya (JP)

(73) Assignees: Autonetworks Technologies, Ltd., Nagoya (JP); Sumitomo Electric Industries, Ltd., Osaka (JP); Sumitomo Wiring Systems, Ltd., Mie (JP)

(*) Notice: Subject to any disclaimer, the term of this patent is extended or adjusted under 35 U.S.C. 154(b) by 0 days.

(21) Appl. No.: 10/036,364

(22) Filed: Jan. 7, 2002

(65) Prior Publication Data

US 2002/0094174 A1 Jul. 18, 2002

(30) Foreign Application Priority Data

Jan. 17, 2001 (JP) ........................................ 2001-008755

(51) Int. Cl.[7] ................................................ G02B 6/36
(52) U.S. Cl. ............................. 385/85; 385/60; 385/88
(58) Field of Search ................................ 385/85, 88–94, 385/60, 62, 78; 264/1.25

(56) References Cited

U.S. PATENT DOCUMENTS

| 5,625,733 | A | * | 4/1997 | Frigo et al. ................... 385/88 |
| 5,770,132 | A | | 6/1998 | Yamamura et al. ......... 264/1.25 |
| 5,845,031 | A | * | 12/1998 | Aoki ........................... 385/92 |
| 5,862,280 | A | * | 1/1999 | Tanaka et al. ................ 385/78 |

FOREIGN PATENT DOCUMENTS

JP 10-148731 A 6/1998

* cited by examiner

*Primary Examiner*—Phan T. H. Palmer
(74) *Attorney, Agent, or Firm*—Oliff & Berridge, PLC

(57) ABSTRACT

The thermally conductive working body 25 having a rectangular parallelepiped shape is provided on the heating surface 21h of the hot plate 21 to protrude therefrom. The plastic optical fiber 2 is inserted into the ferrule portion 11 of the optical connector 10 and then positioned/held to cause its top end portion to protrude. The top end portion of the plastic optical fiber 2, that is projected to the top end side of the ferrule portion 11, is pushed against the mirror surface 25a of the thermally conductive working body 25 by inserting the thermally conductive working body 25 into the protection wall portion 16 of the optical connector 10 in the situation that the thermally conductive working body 25 is heated by the hot plate 21.

11 Claims, 14 Drawing Sheets

OPTICAL FIBER END PROCESSING METHOD AND OPTICAL FIBER END PROCESSING EQUIPMENT

BACKGROUND OF THE INVENTION

1. Field of the Invention

The present invention relates to an optical fiber end processing method and an optical fiber end processing equipment for an optical connector that is employed between an optical fiber and an optical transmitting/receiving element or employed in a connection portion between the optical fibers in the optical communication field such as OA, FA, a vehicle equipment, etc.

2. Description of the Related Art

In the prior art, for example, in the optical connector employed in the car, etc., such a structure is employed that, in order to prevent the worker, etc. from erroneously touching the end surface of the plastic optical fiber, the top end portion of the ferrule that holds the end portion of the plastic optical fiber is arranged at the position that is retreated into the protection wall formed in the connector housing.

Meanwhile, in the optical connector, in order to prevent the attenuation of the light at the plastic optical fiber end surface serving as the connection end to the counterpart side, the end processing must be applied by pushing the plastic optical fiber end surface exposed from the top end portion of the ferrule against the hot plate surface which is subjected to the mirror process, etc.

Therefore, in the prior art, it is common that the connector housing having the protection wall and the ferrule are formed as separate bodies, then the plastic optical fiber is installed/held in the ferrule to apply the end process, and then the ferrule is assembled into the connector housing.

However, as described above, in the optical connector in which the ferrule and the connector housing are formed as the separate bodies, there is the problem that the number of parts is large and also the assembling of the ferrule and the connector housing becomes complicated.

Nevertheless, if the ferrule and the connector housing are integrally formed, the top end portion of the ferrule is arranged at the position that is retreated into the protection wall formed in the connector housing. Therefore, there is the problem that, since the protection wall acts as the obstacle, the top end portion of the plastic optical fiber that is protruded to the top end portion of the ferrule cannot be pushed against the flat hot plate surface and thus the end process becomes difficult.

SUMMARY OF THE INVENTION

Therefore, it is an object of the present invention is to provide an optical fiber end processing method and an optical fiber end processing equipment, which is capable of executing easily the end process of the plastic optical fiber in the top end portion of the ferrule portion that is arranged at the position retreated into the protection wall of the connector housing portion.

In order to overcome the above subjects, an optical fiber end processing method for an optical connector according to a first aspect of the invention in which a ferrule portion for receiving/ holding an end portion of a plastic optical fiber is formed integrally to protrude from a connector housing portion and also an almost cylindrical protection wall portion is formed integrally in the connector housing portion to extend to a top end side rather than the ferrule portion, which comprises the steps of preparing an optical fiber end processing equipment in which a thermally conductive working body is provided onto a heating surface of a hot plate to project therefrom and a projected surface of the thermally conductive working body is worked into a mirror surface; inserting the plastic optical fiber into the ferrule portion to cause its top end portion to protrude; and pushing the top end portion of the plastic optical fiber that is projected to the top end side of the ferrule portion against a mirror surface of the thermally conductive working body, which is heated by the hot plate, by inserting the thermally conductive working body into the protection wall portion of the optical connector.

According to a second aspect of the invention, an equipment in which the hot plate and the thermally conductive working body are formed separate bodies and the thermally conductive working body is loaded separably on the hot plate is prepared as the optical fiber end processing equipment, the top end portion of the plastic optical fiber is pushed against the mirror surface of the thermally conductive working body, and the optical connector together with the thermally conductive working body is removed from the hot plate by utilizing an adhesive force of the heated/melted top end portion of the plastic optical fiber to the mirror surface of the thermally conductive working body, and then the thermally conductive working body is removed from the top end portion of the plastic optical fiber after the top end portion of the plastic optical fiber, that is protruded from the top end side of the ferrule portion, and the thermally conductive working body are cooled.

Also, according to a third aspect of the invention, an equipment in which the hot plate and the thermally conductive working body are formed separate bodies and the thermally conductive working body is formed as a laminated body of a plurality of thermally conductive plate members, at least one surface side of which is worked as the mirror surface is prepared as the optical fiber end processing equipment, and the top end portion of the plastic optical fiber is pushed against the mirror surface of the thermally conductive plate member that is laminated/arranged on an uppermost surface of the thermally conductive working body, then an overlying thermally conductive plate member of the thermally conductive working body is separated from an underlying thermally conductive plate member, by utilizing an adhesive force of the heated/melted top end portion of the plastic optical fiber to the mirror surface of the thermally conductive plate member that is laminated/arranged on the uppermost surface of the thermally conductive working body, and then the optical connector as well as the overlying thermally conductive plate member is removed from the hot plate.

In addition, according to a fourth aspect of the invention, an equipment in which the hot plate and the thermally conductive working body are formed integrally and a cooling mechanism for cooling the thermally conductive working body is incorporated into the thermally conductive working body is prepared as the optical fiber end processing equipment, and the top end portion of the plastic optical fiber is pushed against the mirror surface of the thermally conductive plate member that is laminated/arranged on an uppermost surface of the thermally conductive working body, then the thermally conductive working body is cooled by the cooling mechanism, and then the optical connector is removed from the hot plate by peeling off the top end portion of the plastic optical fiber from the mirror surface of the thermally conductive working body.

Also, in the optical fiber end processing equipment according to a sixth aspect of the present invention, an almost cylindrical guide portion, into an inside of which the protection wall portion is fitted and which guides the plastic optical fiber, that is installed/held in the ferrule portion, toward the mirror surface such that an axis direction of the plastic optical fiber is directed substantially perpendicular to the mirror surface of the thermally conductive working body is provided on the hot plate to protrude therefrom and to surround a position to which the thermally conductive working body provided.

Also, according to a seventh aspect of the present invention, the thermally conductive working body is formed separately from the hot plate.

Also, according to an eighth aspect of the present invention, the thermally conductive working body is formed to insert into the protection wall portion from at least two different directions and at least two mirror surfaces that comes into contact with the top end portion of the plastic optical fiber in respective insertion states are formed.

In addition, according to a ninth aspect of the present invention, the thermally conductive working body is formed as a laminated body of a plurality of thermally conductive plate members at least one surface side of which is worked as the mirror surface.

Also, according to a tenth aspect of the present invention, the thermally conductive working body is formed integrally with the hot plate.

Also, according to an eleventh aspect of the present invention, a refrigerant passage through which cooling medium can be passed is formed in the thermally conductive working body.

BRIEF DESCRIPTION OF THE PREFERRED EMBODIMENTS

FIG. 1A to 1E are views showing an optical connector as an object of an optical fiber end process, in which FIG. 1A is a plan view showing the optical connector, FIG. 1B is a front view showing the optical connector, FIG. 1C is a side view showing the optical connector, FIG. 1D is a rear view showing the optical connector, and FIG. 1E is a bottom view showing the optical connector;

DETAILED DESCRIPTION OF THE PREFERRED EMBODIMENTS

Figure 1A:
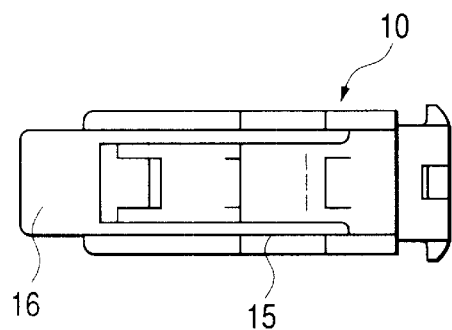
Figure 1B:
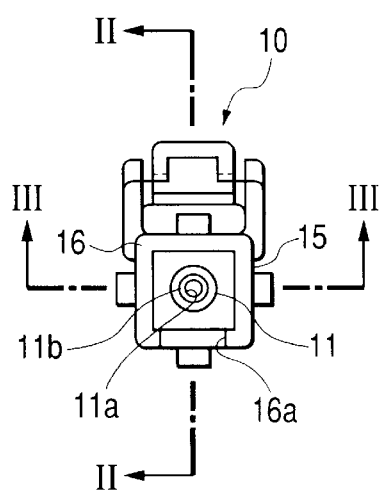
Figure 1C:
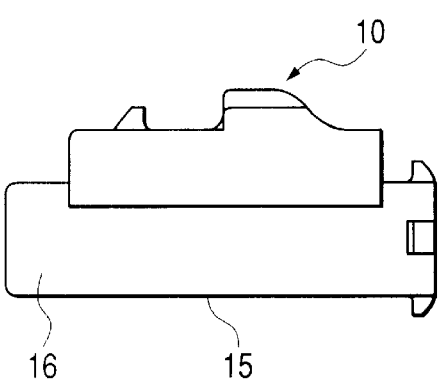
Figure 1D:
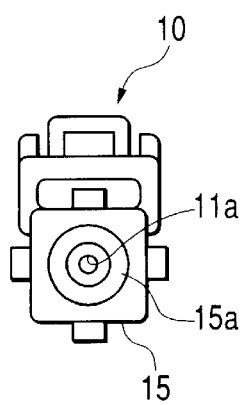
Figure 1E:
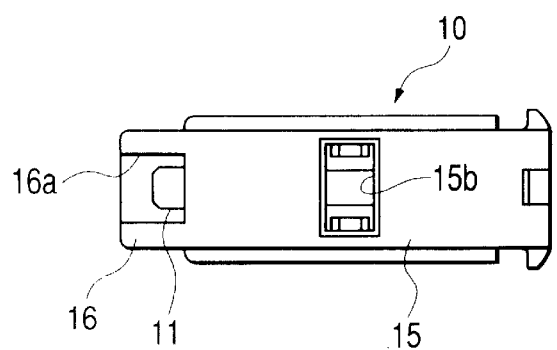
Figure 2:
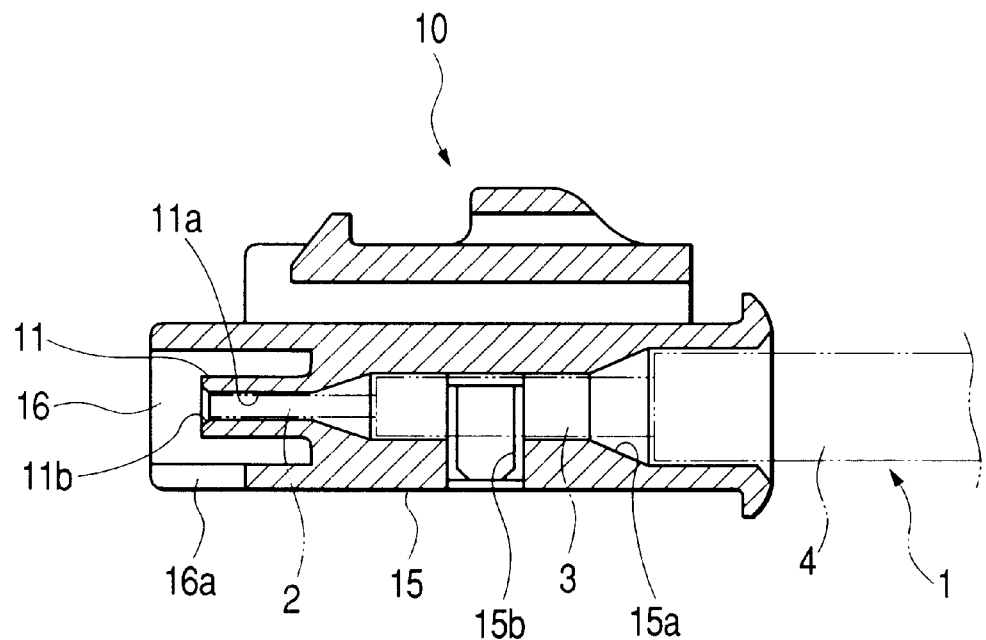
FIG. 2 is a sectional view taken along a II—II line in FIG. 1B.
Figure 3:
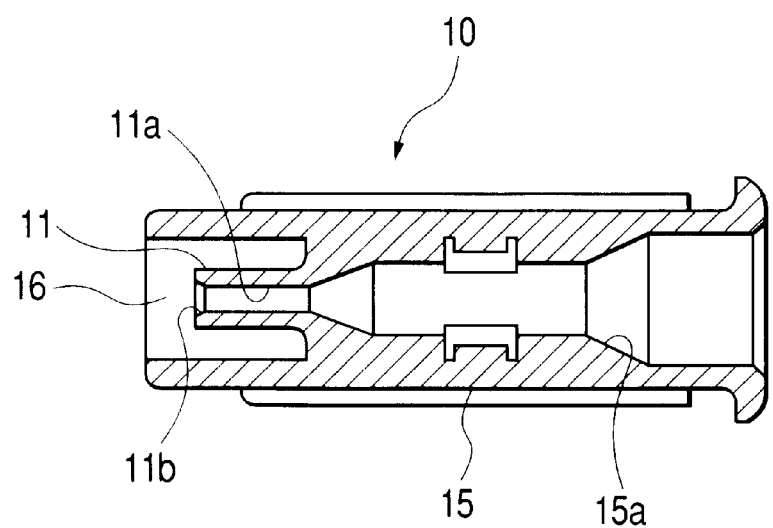
FIG. 3 is a sectional view taken along a III—III line in FIG. 1B.

An optical fiber end processing method and an optical fiber end processing equipment according to a most basic embodiment of the present invention will be explained hereinafter.

First, an optical connector 10 as the object of the optical fiber end process will be explained with reference to FIG. 1A to FIG. 1E, FIG. 2 and FIG. 3 hereunder.

The optical connector 10 is constructed such that a ferrule portion 11 that receives and holds an end portion of a plastic optical fiber 2 is formed integrally to protrude from a connector housing portion 15 and that an almost cylindrical protection wall portion 16 is formed integrally with the connector housing portion 15 to extend to the top end side rather than the ferrule portion 11.

The optical connector that can receive/hold an optical fiber cord 1 in which a first coated portion 3 and a second coated portion 4 are coated around the plastic optical fiber 2 (see FIG. 2) is supposed as the optical connector 10.

In other words, the connector housing portion 15 is formed like an almost square cylinder, and a coated portion receiving hole portion 15a is formed in the connector housing portion 15 along the axis direction. Also, the almost circular-cylindrical ferrule portion 11 is provided to project toward the top end side of the connector housing portion 15. A fiber receiving hole portion 11a is formed in this ferrule portion 11 along its axis direction. The coated portion receiving hole portion 15a and the fiber receiving hole portion 11a are formed to be connected linearly in the connector housing portion 15. Then, the plastic optical fiber 2 is exposed from the end portion of the optical fiber cord 1 and then this exposed portion is inserted into the coated portion receiving hole portion 15a and the fiber receiving hole portion 11a from the rear side of the connector housing portion 15. Thus, not only the exposed plastic optical fiber 2 can be installed into the fiber receiving hole portion 11a, but also the first coated portion 3 and the second coated portion 4 can be installed in the coated portion receiving hole portion 15a.

Also, a means for positioning/holding the first coated portion 3 and the second coated portion 4 as a coated portion of the optical fiber cord 1 is provided to the connector housing portion 15 in the situation that the top end portion of the plastic optical fiber 2 is slightly projected toward the top end side of the ferrule portion 11.

More particularly, if a stopper fitting hole 15b is formed in one side portion of the connector housing portion 15 and then a stopper member (not shown) is inserted/arranged into the coated portion receiving hole portion 15a through the stopper fitting hole 15b to engage the stopper member with the first coated portion 3 as the coated portion of the optical fiber cord 1, such optical fiber cord 1 can be positioned/held.

In this case, such a structure may be employed that the optical fiber cord 1 is positioned/held by the adhesives, etc.

Also, in the present optical connector 10, the top end portion of the fiber receiving hole portion 11a is formed as a tapered concave portion 11b whose inner peripheral surface is extended sequentially toward the top end side. Then, if the top end portion of the plastic optical fiber 2 is heated/melted by pushing against a thermally conductive working body 25 described later in the situation that the top end portion of the plastic optical fiber 2 is slightly projected toward the top end side of ferrule portion 11, the heated/melted portion is filled and installed in the tapered concave portion 11b. Thus, the engagement to prevent the disconnection of the plastic optical fiber 2 from the ferrule portion 11 can be attained.

Also, the protection wall portion 16 is formed like an almost square cylinder and is formed integrally with the connector housing portion 15 so as to project from the top end side of the connector housing portion 15 such that the protection wall portion 16 is extended toward the top end side rather than the ferrule portion 11 to surround the ferrule portion 11.

In other words, the top end portion of the ferrule portion 11 is arranged at the position that is retreated inwardly from the top end portion of the protection wall portion 16. In order to prevent the worker, etc. from erroneously touching the end surface of the plastic optical fiber 2 exposed from the top end portion of the ferrule portion 11, the end surface of the plastic optical fiber 2 can be protected by the protection wall portion 16.

Also, a notched portion 16a is formed at the top end portion of the protection wall portion 16 to have a predetermined shape. This notched portion 16a is shaped into the shape through which at least the top end portion of the ferrule portion 11 can be watched from the side and which does not damage the function such that the protection wall portion 16 protects the end surface of the plastic optical fiber 2 exposed from the top end portion of the ferrule portion 11. In the present embodiment, the notched portion 16a having an almost rectangular shape is formed on one side portion of the protection wall portion 16. A function of this notched portion 16a will be described later.

Next, an optical fiber end processing equipment 20 and an optical fiber end processing method for executing the end process of the plastic optical fiber 2 that is installed/held in the ferrule portion 11 of the optical connector 10 will be explained with reference to FIG. 4 to FIG. 6 hereunder.

This optical fiber end processing equipment 20 comprises a hot plate 21 having a flat heating surface 21h, and the thermally conductive working body 25 provided onto the hot plate 21 to project therefrom.

The hot plate 21 and the thermally conductive working body 25 may be formed integrally or formed as separate bodies. In the present embodiment, explanation will be made under the assumption that they are formed as separate bodies. In the case that they are formed integrally or formed as separate bodies, an available structure peculiar to the optical fiber end processing equipment or a peculiar optical fiber end processing method, etc. will be explained in variations 1 and 2 described later.

The hot plate 21 is formed of material with good thermal conductivity such as metal (iron, etc.) as an almost square plate, and then arranged/fixed to an upper opening 24a of the equipment main body portion 24, which is formed like a hollow casing, to close the opening 24a.

One surface side of the hot plate 21 is formed as the flat heating surface 21h. The hot plate 21 is arranged/fixed to the opening 24a at the substantially horizontal position to direct its heating surface 21h upwardly. Then, the thermally conductive working body 25 can be loaded separably onto the heating surface 21h.

Figure 4:
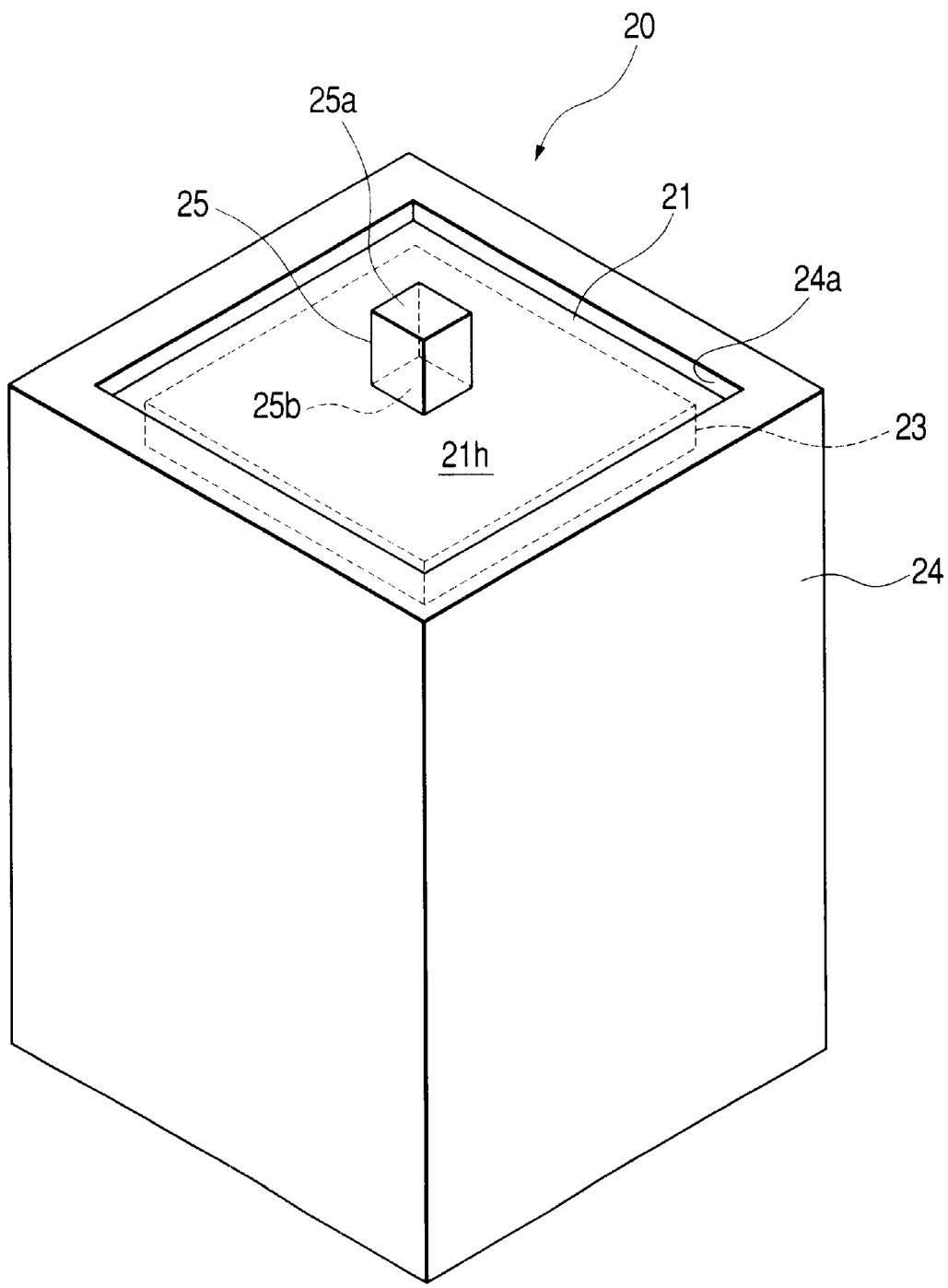
FIG. 4 is a perspective view showing an optical fiber end processing equipment according to an embodiment of the present invention.

Also, a heater 23 is arranged on the under surface side of the hot plate 21 to extend over the entire under surface or partially in the inside of the equipment main body portion 24 (the behavior that the heater 23 is arranged to extend over the almost entire under surface of the hot plate 21 is shown in FIG. 4). The heater 23 is constructed to switch its heating state and its non-heating state by switching ON/OFF of the current supply to the heater 23, for example. Then, if the heater 23 is set to the heating state by supplying the current, the hot plate 21 is heated from the lower surface side and then the heating surface 21h is heated.

The thermally conductive working body 25 is formed such that such body 25 can be inserted into the protection wall portion 16 of the optical connector 10. The thermally conductive working body 25 has a mirror surface 25a that can come into contact with the top end portion of the plastic optical fiber 2, which is protruded from the top end portion of the ferrule portion 11 in the protection wall portion 16, in the situation that such body 25 is inserted into the protection wall portion 16.

In the present embodiment, the thermally conductive working body 25 is formed into an almost rectangular parallelepiped shape, which can be inserted into the almost square cylindrical protection wall portion 16, by the material with good thermal conductivity such as the metal (iron, copper, aluminum, or the like), etc. One side surface (the upward-directed surface in FIG. 4 to FIG. 6) is formed as a mirror surface 25a by polishing, coating, etc. along the inserting direction, while the other side surface is formed as a contact surface 25b which can contact to the heating surface 21h via the surface contact. Also, a length dimension H1 (see FIG. 5) along the inserting direction of the thermally conductive working body 25 into the protection wall portion 16 is formed larger than a distance dimension H2 between the top end portion of the ferrule portion 11 and the top end portion of the protection wall portion 16, i.e., a retreated dimension H2 of the ferrule portion 11 from the top end portion of the protection wall portion 16 (see FIG. 5).

Then, the thermally conductive working body 25 is loaded on the heating surface 21h to cause the contact surface 25b to surface-contact to the heating surface 21h while directing the mirror surface 25a upwardly, and then the hot plate 21 is heated by the heater 23 in this situation. Thus, the heat of the hot plate 21 is transmitted to the thermally conductive working body 25 mainly via the contact portion between the heating surface 21 and the contact surface 25b, so that the thermally conductive working body 25 can be heated. Also, when the thermally conductive working body 25 is inserted into the protection wall portion 16, the plastic optical fiber 2 can be brought into contact with the mirror surface 25a of the thermally conductive working body 25, which is heated as above, before the top end portion of the protection wall portion 16 comes into contact with the heating surface 21h of the hot plate 21.

The optical fiber end processing method using the optical fiber end processing equipment 20 constructed as above will be explained with reference to FIG. 5 and FIG. 6 hereunder.

Figure 5:
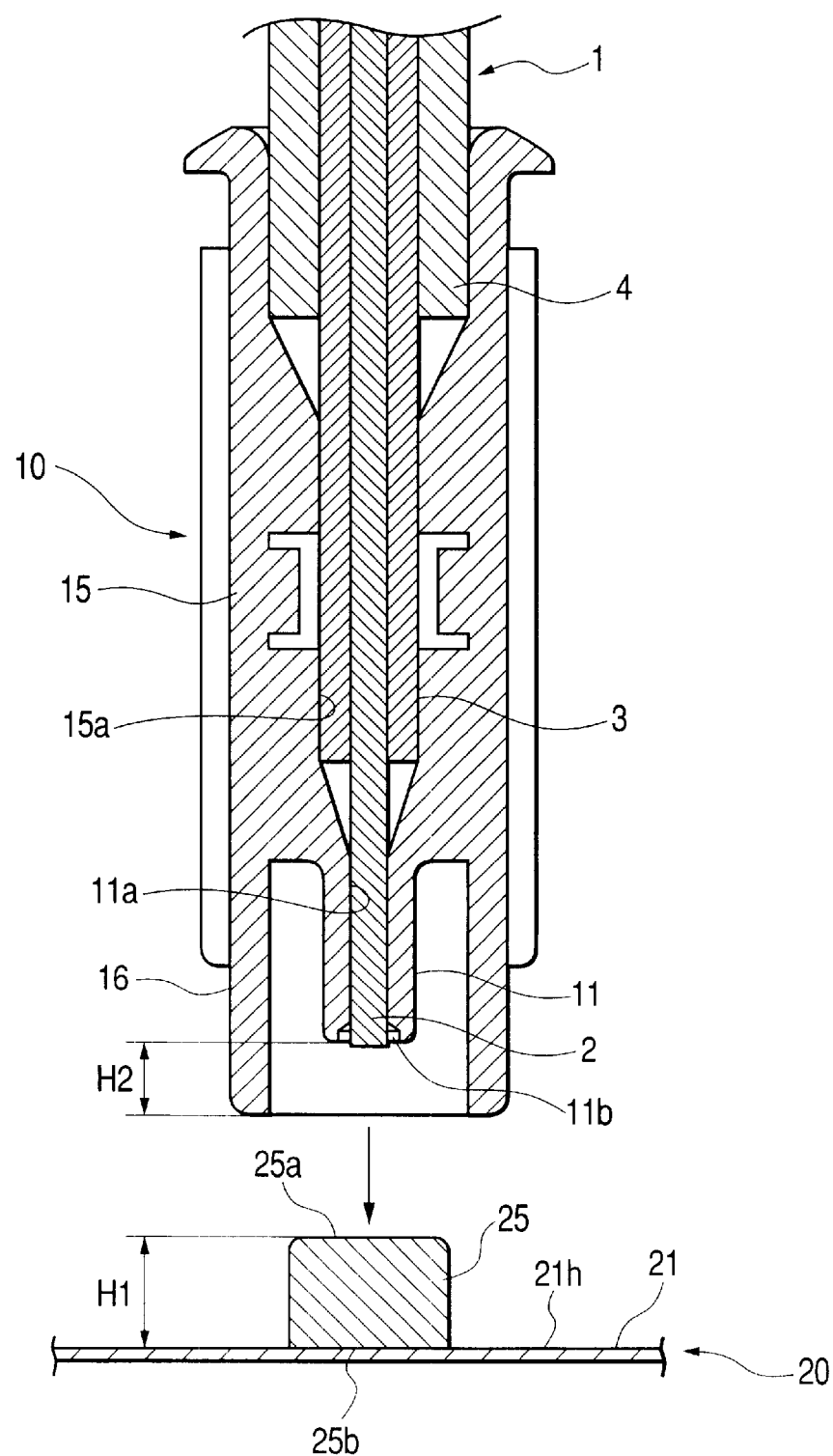
FIG. 5 is an enlarged pertinent portion sectional view showing one step of the optical fiber end process.

First, as shown in FIG. 5, the optical fiber end processing equipment 20 in which the above thermally conductive working body 25 is loaded on the heating surface 21h of the hot plate 21 is prepared, and also the plastic optical fiber 2 is inserted into the ferrule portion 11 to cause the top end portion to protrude. At this time, the optical fiber cord 1 is previously positioned/held in the coated portion receiving hole portion 15a along its axis direction in the situation that the top end portion of the plastic optical fiber 2 is slightly projected toward the top end side of the ferrule portion 11 by engaging the coated portion of the optical fiber cord 1 with the stopper member that is inserted/arranged in the coated portion receiving hole portion 15a, or the like.

Figure 6:
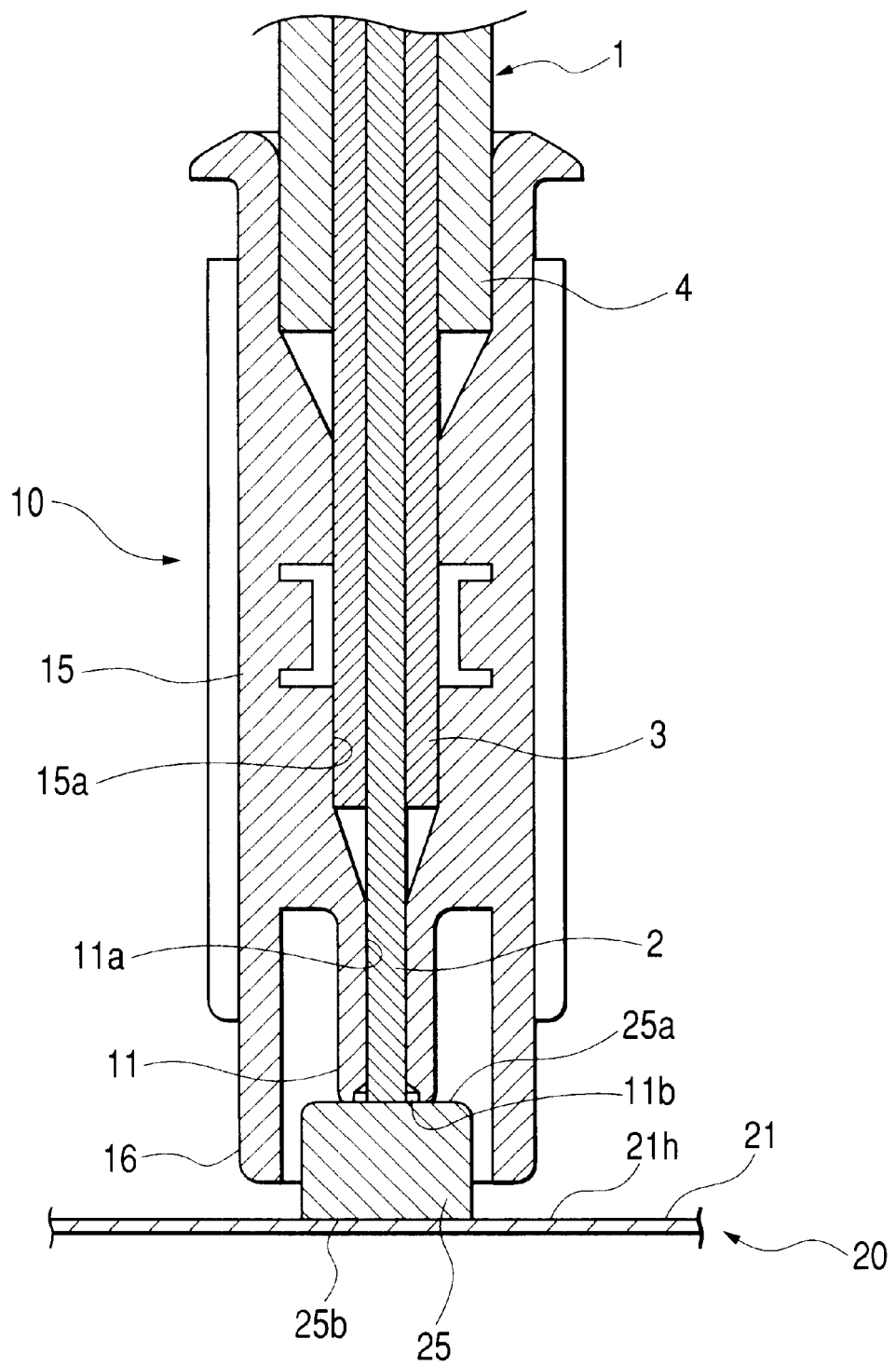
FIG. 6 is an enlarged pertinent portion sectional view showing another step of the optical fiber end process.

Then, as shown in FIG. 6, the top end portion of the plastic optical fiber 2 projected from the top end side of the ferrule portion 11 is pushed against the mirror surface 25a of the thermally conductive working body 25, which is heated by the hot plate 21, by pushing down the optical connector 10 to insert the thermally conductive working body 25 into the protection wall portion 16. At that time, not only the top end portion of the plastic optical fiber 2 is heated/melted and then the heated/melted portion is filled in the tapered concave portion 11b, but also the mirror surface 25a is transferred onto the end surface of the plastic optical fiber 2 and then the end surface can be finished as the smooth mirror surface. The timing for heating the thermally conductive working body 25 by the hot plate 21 may be set before or after the thermally conductive working body 25 is pushed down to insert into the protection wall portion 16 or set to the middle of the pushing down.

After this, if the optical connector 10 is removed from the hot plate 21 by peeling off the end surface of the plastic optical fiber 2 from the mirror surface 25a, the manufacture of the optical connector 10 in which the plastic optical fiber 2 is subjected to the end process at the top end portion of ferrule portion 11 can be finished.

At this time, if the end surface of the plastic optical fiber 2 is peeled off forcedly from the mirror surface 25a in the state that the heated/melted top end portion of the plastic optical fiber 2 is still adhered to the mirror surface 25a, the creases are generated on the end surface of the plastic optical fiber 2, etc., so that the end processing precision becomes worse. Therefore, after the top end portion of the plastic optical fiber 2 is pushed against the mirror surface 25a, the end surface of the plastic optical fiber 2 may be removed from the of the plastic optical fiber 2 after the end surface of the plastic optical fiber 2 and the thermally conductive working body 25 are naturally cooled by stopping the heating using the heater 23 or the end surface of the plastic optical fiber 2 and the thermally conductive working body 25 are forcedly cooled by the cooling air or the liquid nitrogen.

According to the optical fiber end processing method and the optical fiber end processing equipment 20 constructed as above, the optical fiber end processing equipment 20 in which the thermally conductive working body 25 is provided onto the heating surface 21h of the hot plate 21 to protrude therefrom and the projected surface of the thermally conductive working body 25 is worked into the mirror surface 25a is prepared, then the plastic optical fiber 2 is inserted into the ferrule portion 11 to cause the top end portion to protrude, and then the top end portion of the plastic optical fiber 2 that is projected to the top end side of the ferrule portion 11 is pushed against the mirror surface 25a of the thermally conductive working body 25, which is heated by the hot plate 21, by inserting the thermally conductive working body 25 into the protection wall portion 16 of the optical connector 10. Therefore, the end process of the plastic optical fiber 2 can be easily executed at the top end portion of the ferrule portion 11 that is arranged at the position retreated into the protection wall portion 16 of the connector housing portion 15.

Particularly, in the present embodiment, since the notched portion 16a through which the top end portion of the ferrule portion 11 can be watched from the side is formed in the protection wall portion 16 of the optical connector 10, the end process of the plastic optical fiber 2, etc. can be carried out while monitoring the relative positional relationship between the top end portion of the ferrule portion 11 and the predetermined the thermally conductive working body 25 with the eye via the notched portion 16a, so that the end processing operation can be carried out precisely and easily by utilizing the notched portion 16a.

In addition, if the ferrule portion 11 is watched from the side via the notched portion 16a after the end processing operation, the state of the top end portion of the ferrule portion 11 (e.g., projection or dent of the plastic optical fiber 2 from the top end portion of the ferrule portion 11, distortion, flaw, crack of the plastic optical fiber 2 itself, etc.) can be easily checked. Therefore, there is such an advantage that the defective of the optical connector 10 can be found previously and can be eliminated.

[Variation 1]

Next, an optical fiber end processing method and an optical fiber end processing equipment 20B according to a variation 1 will be explained with reference to FIG. 7 to FIG. 9 hereunder.

In the optical fiber end processing equipment 20B according to this variation 1, a thermally conductive working body 25B, that corresponds to the thermally conductive working body 25, and the hot plate 21 are formed as separate bodies, and also the thermally conductive working body 25B is loaded separably on the heating surface 21h of the hot plate 21.

Further, an almost cylindrical guide portion 30, into the inside of which the protection wall portion 16 can be fitted and which can guide the plastic optical fiber 2, that is installed/held in the ferrule portion 11, toward the mirror surface 25Ba such that the axis direction of the plastic optical fiber 2 is directed substantially perpendicular to the mirror surface 25Ba of the thermally conductive working body 25B is provided on the hot plate 21 to protrude therefrom and to surround the position to which the thermally conductive working body 25B is provided. It is preferable that this guide portion 30 should be formed of the material that can stand the high temperature necessary for the end process of the plastic optical fiber 2 and can guide smoothly the protection wall portion 16, for example, fluororesin (Teflon (trademark)), etc.

In this case, in the optical fiber end processing equipment 20B according to the present variation 1, elements except the above constituent elements are similar to the constituent elements in the above embodiment. Their explanation will be omitted by affixing the same symbols to these elements, or the like.

The optical fiber end processing method using the optical fiber end processing equipment 20B will be explained with reference to FIG. 7 to FIG. 9 hereunder.

Figure 7:
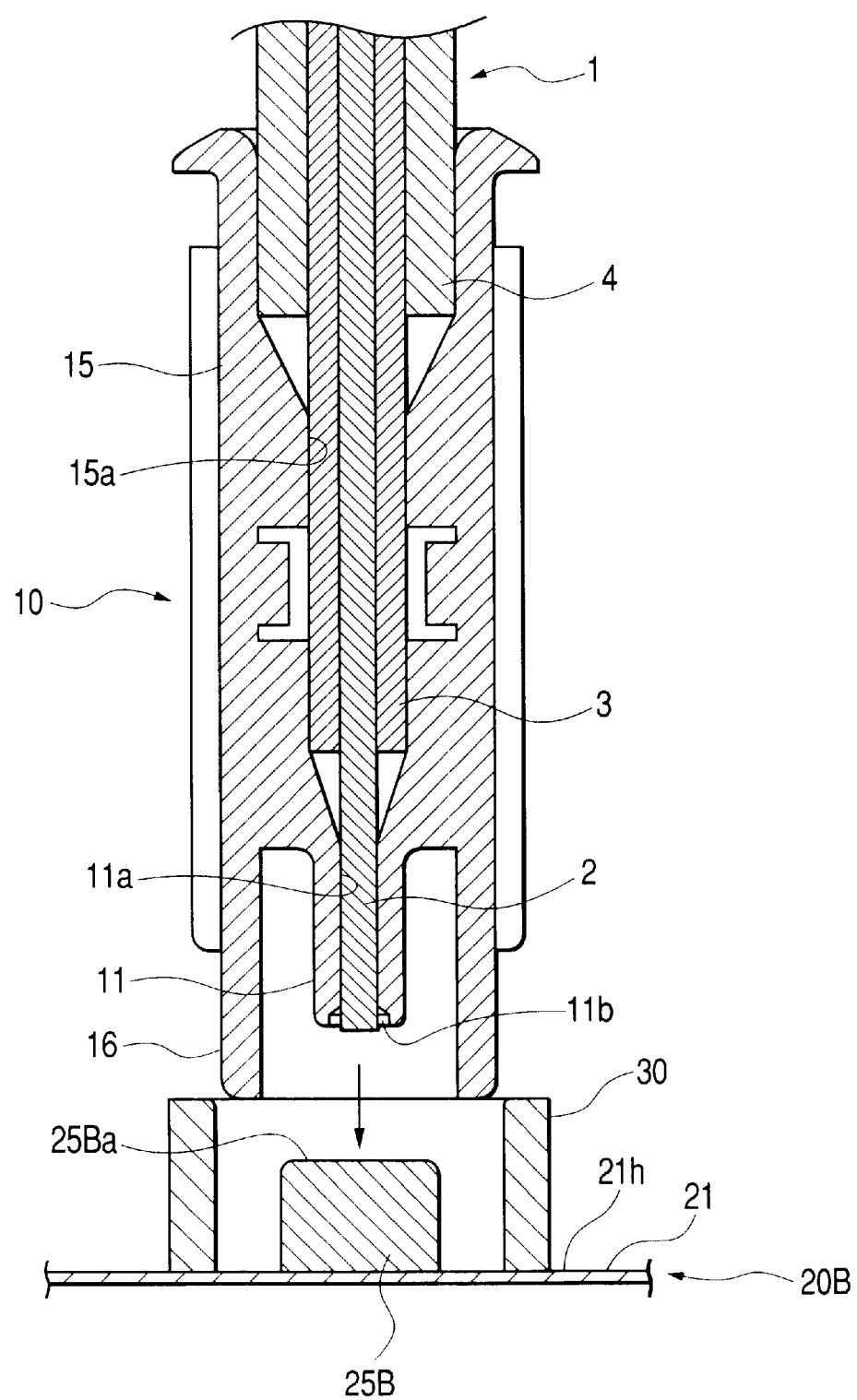
FIG. 7 is an enlarged pertinent portion sectional view showing one step of the optical fiber end process according to a variation 1.

First, as shown in FIG. 7, the above optical fiber end processing equipment 20B in which the thermally conductive working body 25B is loaded separably onto the heating surface 21h of the hot plate 21 is prepared, and then the plastic optical fiber 2 is inserted into the ferrule portion 11 to cause the top end portion to protrude. At this time, on the optical fiber end processing equipment 20B side, the thermally conductive working body 25B is arranged in the center portion of the guide portion 30 such that the top end portion of the plastic optical fiber 2, that protrudes from the top end portion of the ferrule portion 11 when the protection wall portion 16 is fitted into the inside of the guide portion 30, can come into contact with the thermally conductive working body 25B. Also, on the optical connector 10 side, like the above embodiment, the optical fiber cord 1 is positioned/held in the coated portion receiving hole portion 15a along its axis direction.

Figure 8:
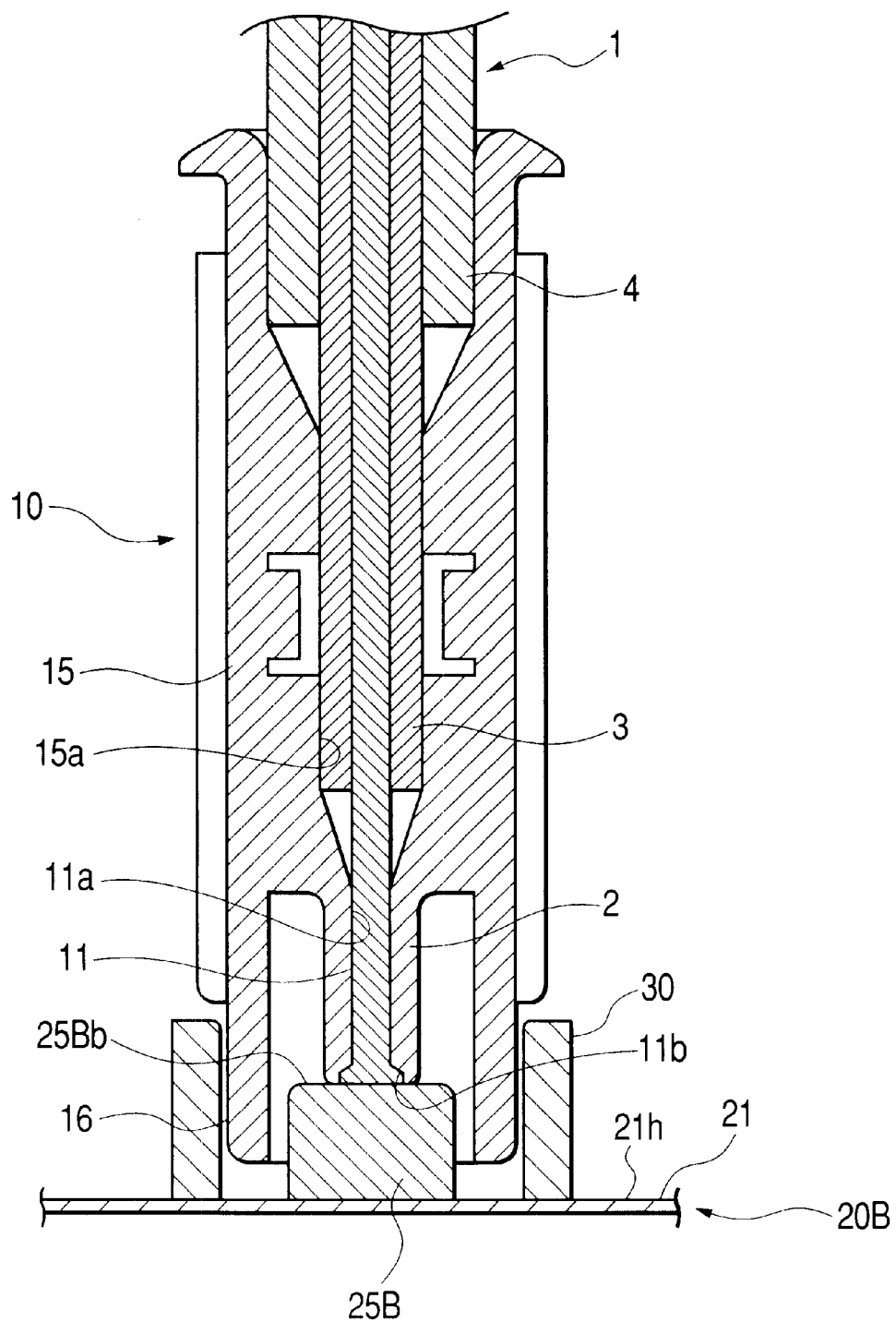
FIG. 8 is an enlarged pertinent portion sectional view showing another step of the optical fiber end process according to the variation 1.

Then, as shown in FIG. 8, the optical connector 10 is pushed down to fit the protection wall portion 16 into the inside of the guide portion 30. Accordingly, the plastic optical fiber 2 is guided toward the mirror surface 25Ba at the position that the axis direction is substantially perpendicular to the mirror surface 25Ba, and then the top end portion of the plastic optical fiber 2 is pushed against the mirror surface 25Ba that is heated by the hot plate 21. At that time, not only the top end portion of the plastic optical fiber 2 is heated/melted and then the heated/melted portion is filled and installed in the tapered concave portion 11b, but also the mirror surface 25Ba is transferred onto the end surface of the plastic optical fiber 2 and then the end surface can be finished as the smooth mirror surface. The timing for heating the thermally conductive working body 25 by the hot plate 21 may be set before or after the optical connector 10 is pushed down or may be set to the middle of the pushing down.

Figure 9:
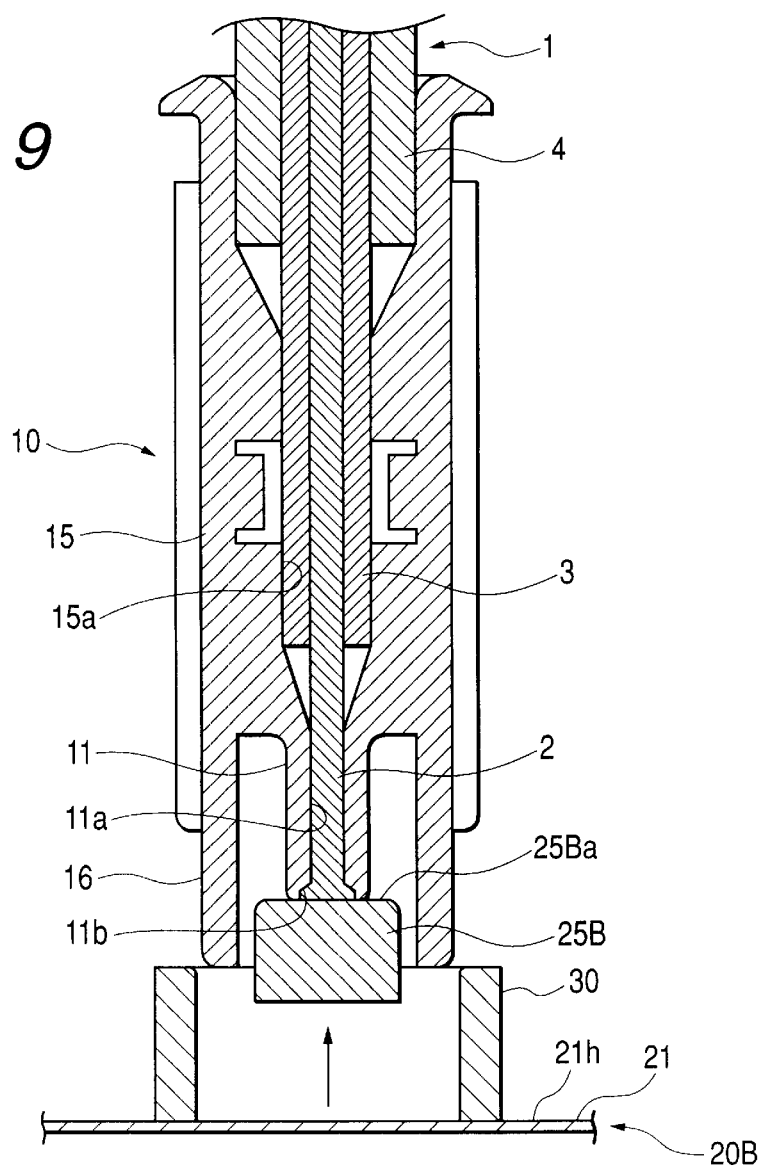
FIG. 9 is an enlarged pertinent portion sectional view showing still another step of the optical fiber end process according to the variation 1.

Then, as shown in FIG. 9, the optical connector 10 together with the thermally conductive working body 25B is removed from the hot plate 21 by utilizing the adhesive force of the heated/melted top end portion of the plastic optical fiber 2 to the mirror surface 25Ba of the thermally conductive working body 25B. That is, the top end portion of the plastic optical fiber 2 is adhered to the mirror surface 25Ba when such top end portion of the plastic optical fiber 2 is pushed against the mirror surface 25Ba of the thermally conductive working body 25B and then heated/ melted. Therefore, if the optical connector 10 is lifted upwardly as it is, the thermally conductive working body 25B as well as the optical connector 10 can be lifted upwardly while adhering the thermally conductive working body 25B to the end surface of the plastic optical fiber 2.

Finally, the top end portion of the plastic optical fiber 2 and the thermally conductive working body 25B are naturally cooled or forcedly cooled by the liquid nitrogen, the cooling air, etc., and then the thermally conductive working body 25B is removed from the top end portion of the plastic optical fiber 2. Thus, the manufacture of the optical connector 10 in which the plastic optical fiber 2 is subjected to the end process at the top end portion of the ferrule portion 11 can be completed.

In this variation 1, following advantages can be achieved in addition to the advantages in the above embodiment.

In other words, since the above thermally conductive working body 25B is loaded separably onto the heating surface 21h of the hot plate 21, the optical connector 10 together with the thermally conductive working body 25B is removed from the hot plate 21 by utilizing the adhesive force of the heated/melted top end portion of the plastic optical fiber 2 to the mirror surface 25Ba of the thermally conductive working body 25B, and then the thermally conductive working body 25B can be removed from the top end portion of the plastic optical fiber 2 after the thermally conductive working body 25B, etc. are cooled. In this case, since the thermally conductive working body 25B, etc. can be cooled quickly by separating the thermally conductive working body 25B, etc. from the hot plate 21, the end process of the plastic optical fiber can be executed with good precision in a short time.

In this case, it is preferable that the thermally conductive working body 25B should be formed of the material, that is lightweight and has good thermal conductivity, for example, aluminum, such that the thermally conductive working body 25B can be easily lifted up from the hot plate 21 by the adhesive force of the heated/melted top end portion of the plastic optical fiber 2.

Also, like the present variation 1, it is preferable that, if the thermally conductive working body 25B and the hot plate 21 are formed separately, such thermally conductive working body 25B should be formed to insert into the protection wall portion 16 from at least two different directions and at least two mirror surfaces that can contact to the top end portion of the plastic optical fiber 2 in respective insertion states should be formed.

More particularly, the thermally conductive working body 25B may be formed into the almost rectangular parallelepiped shape that can be inserted into the protection wall portion 16, and then surfaces on one side and the other side (upper and lower surfaces of the thermally conductive working body 25B in FIG. 7 and FIG. 9) may be finished as the mirror surface along the insertion direction.

In this case, if the predetermined one mirror surface used in the end process of the plastic optical fiber 2 is polluted, the thermally conductive working body 25B is turned upside down to direct the other mirror surface upwardly, and then the end process of the plastic optical fiber 2 can be carried out continuously by using the other mirror surface, which is convenient.

In this case, the thermally conductive working body 25B is formed into the cube shape to be inserted into the protection wall portion 16 from six surface sides respectively, and all six surfaces are finished as the mirror surface. Thus, if the mirror surface used in the end process is polluted, such mirror surface can be replaced with other mirror surfaces subsequently, so that the end surface processing operation can be carried out continuously, which is also convenient.

Further, in the present variation 1, the almost cylindrical guide portion 30, into the inside of which the protection wall portion 16 can be fitted and which can guide the plastic optical fiber 2, that is installed/held in the ferrule portion 11, toward the mirror surface 25Ba such that the axis direction of the plastic optical fiber 2 is directed substantially perpendicular to the mirror surface 25Ba of the thermally conductive working body 25B is provided onto the hot plate 21 to protrude therefrom and to surround the position to which the thermally conductive working body 25B is provided. Therefore, the plastic optical fiber 2 can be guided precisely to the mirror surface 25Ba such that its axis direction is set substantially perpendicular to the mirror surface 25Ba. As a result, the end process miss or variation in the optical properties can be suppressed due to the fact that the end surface of the plastic optical fiber 2 is inclined to the axis direction after the end process is finished.

[Variation 2]

Figure 10:
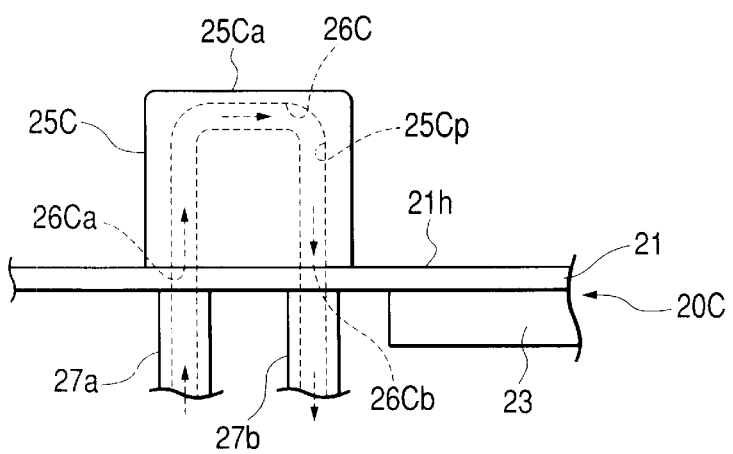
FIG. 10 is an enlarged pertinent portion sectional view showing an optical fiber end processing equipment according to a variation 2.

Next, an optical fiber end processing method and an optical fiber end processing equipment 20C according to a variation 2 will be explained with reference to FIG. 10 to FIG. 10 hereunder.

In the optical fiber end processing equipment 20C of this variation 2, a thermally conductive working body 25C equivalent to the above thermally conductive working body 25 is constructed integrally with the hot plate 21.

Also, a cooling mechanism for cooling the thermally conductive working body 25C is incorporated into the optical fiber end processing equipment 20C.

That is, the thermally conductive working body 25C has an upward-directed mirror surface 25Ca, and a refrigerant passage 26C through which the cooling medium can be passed is formed in the inside of the mirror surface 25Ca.

More particularly, the reverse U-shaped refrigerant passage 26C is formed in the thermally conductive working body 25C. An inlet side opening portion 26Ca and an outlet side opening portion 26Cb of the refrigerant passage 26C are opened on the lower surface side of the thermally conductive working body 25C. A refrigerant inlet pipe 27a and a refrigerant outlet pipe 27b are coupled to the inlet side opening portion 26Ca and the outlet side opening portion 26Cb via through holes formed in the hot plate 21 respectively (see FIG. 10).

This heater 23 is provided at the position that escapes the refrigerant inlet pipe 27a and the refrigerant outlet pipe 27b.

Then, if the refrigerant such as the cooling water, etc. supplied from a refrigerant supplying portion (not shown) is fed into the refrigerant passage 26C from the refrigerant inlet pipe 27a and then discharged to the outside from the refrigerant outlet pipe 27b, the thermally conductive working body 25C is cooled.

In this case, in the optical fiber end processing equipment 20C according to the present variation 2, elements except the above constituent elements are similar to the constituent elements in the above embodiment. Their explanation will be omitted by affixing the same symbols to these elements, or the like.

Also, in the optical fiber end processing equipment 20C according to the present variation 2, the guide portion 30 having the structure similar to that explained in the above variation 1 is provided to project.

An optical fiber end processing method using the present optical fiber end processing equipment 20C will be explained with reference to FIG. 11 to FIG. 13 hereunder.

Figure 11:
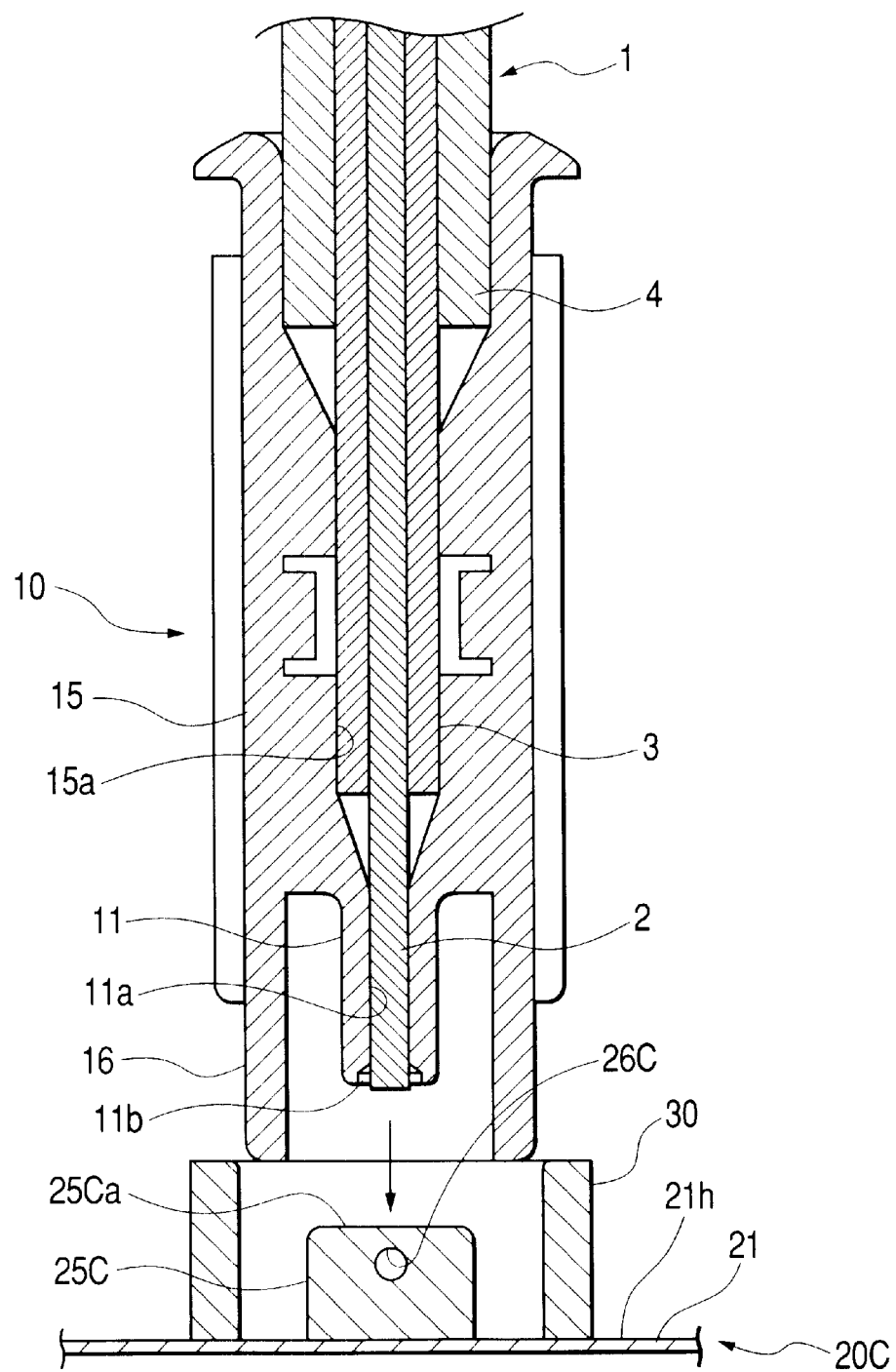
FIG. 11 is an enlarged pertinent portion sectional view showing one step of the optical fiber end process according to the variation 2.

First, as shown in FIG. 11, the optical fiber end processing equipment 20C is prepared and also the plastic optical fiber 2 is inserted into the ferrule portion 11 to cause the top end portion to protrude. At this time, on the optical connector 10 side, the optical fiber cord 1 is positioned/held in the coated portion receiving hole portion 15a along its axis direction in the same way as the above embodiment.

Figure 12:
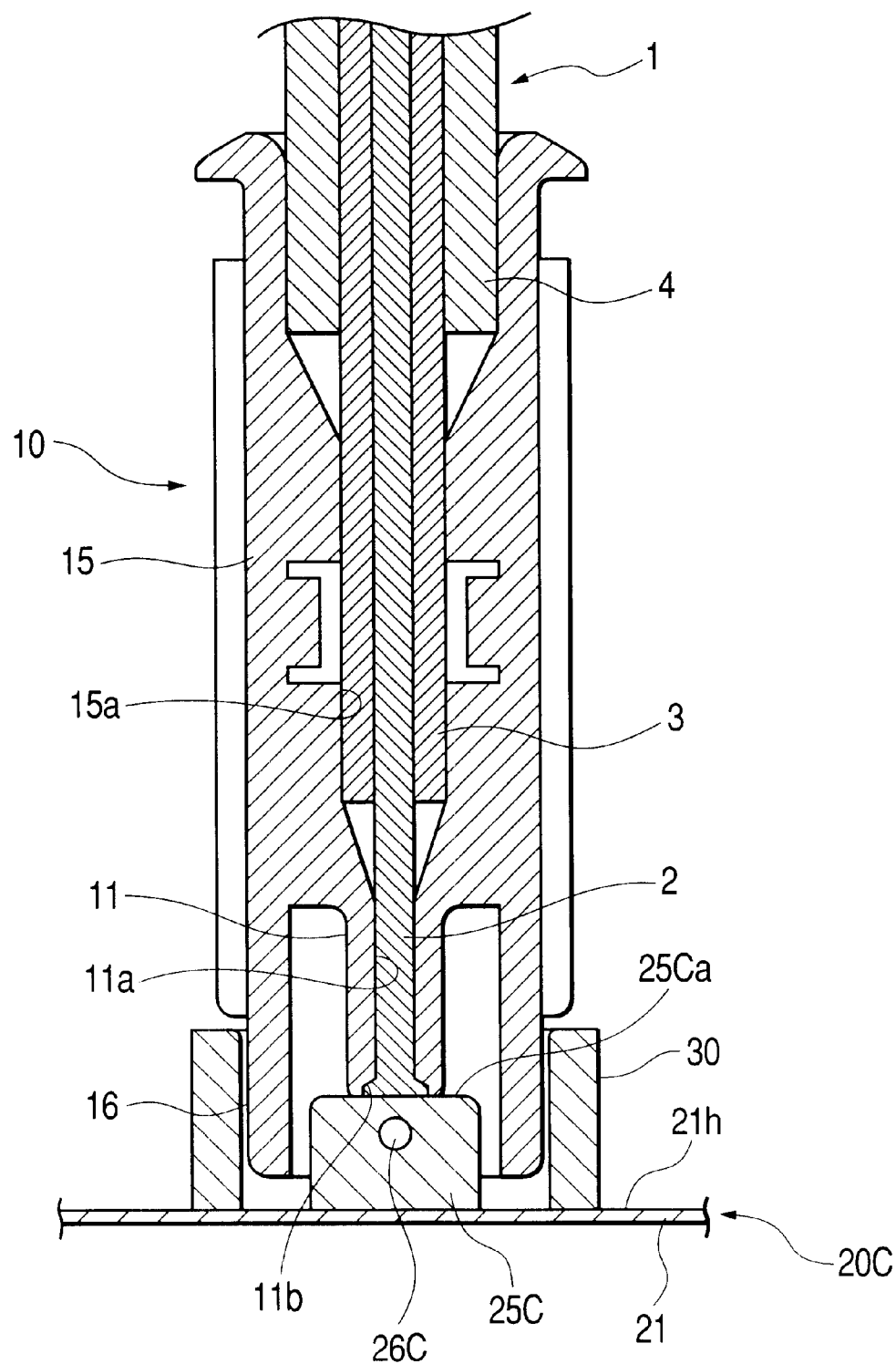
FIG. 12 is an enlarged pertinent portion sectional view showing another step of the optical fiber end process according to the variation 2.
Figure 13:
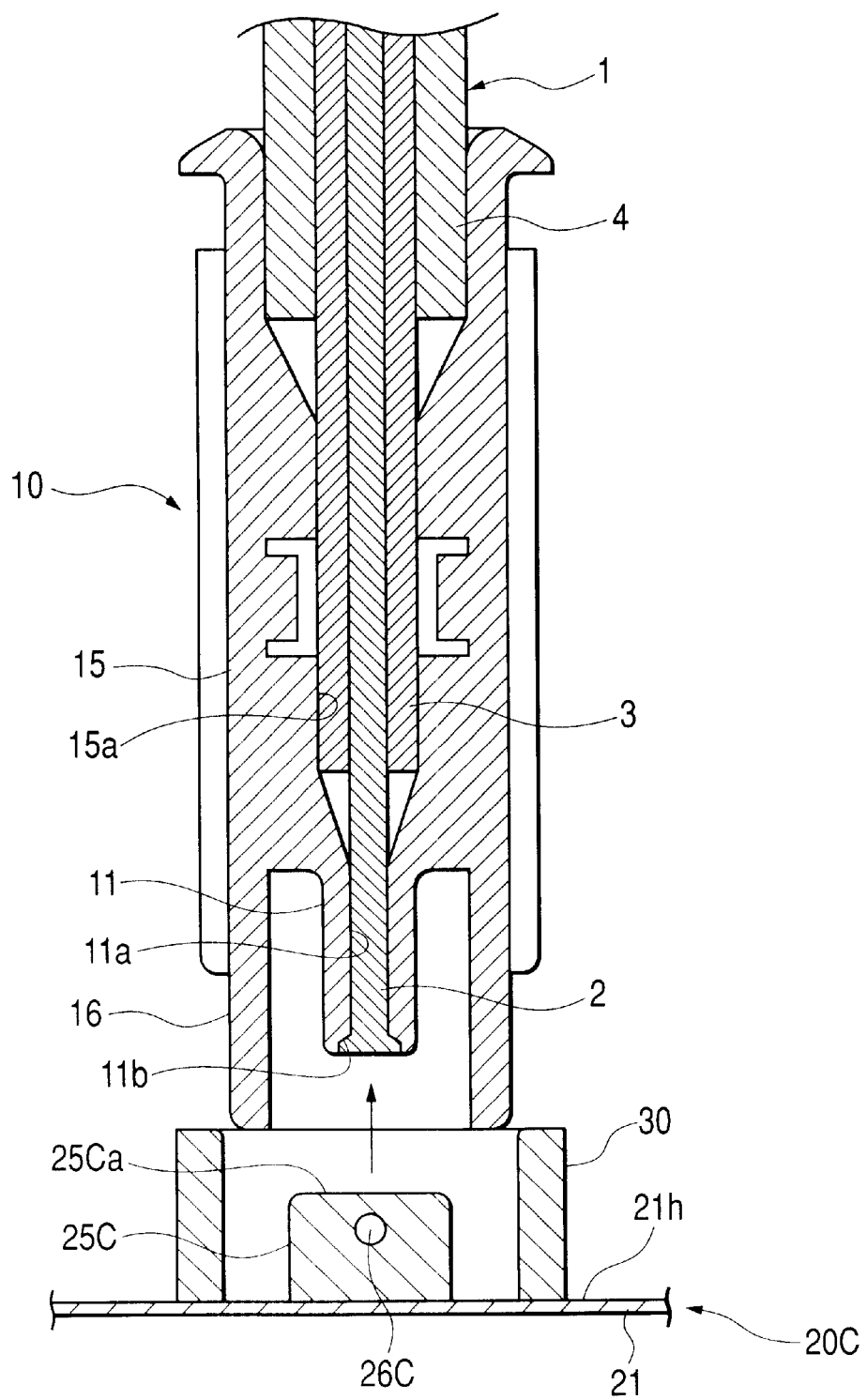
FIG. 13 is an enlarged pertinent portion sectional view showing still another step of the optical fiber end process according to the variation 2.

Then, as shown in FIG. 12, the optical connector 10 is pushed down to fit the protection wall portion 16 into the inside of the guide portion 30. Accordingly, the plastic optical fiber 2 is guided toward the mirror surface 25Ca at the position that its axis direction is substantially perpendicular to the mirror surface 25Ca, and then the top end portion of the plastic optical fiber 2 projected to the top end side of the ferrule portion 11 is pushed against the mirror surface 25Ba that is heated by the hot plate 21. At that time, not only the top end portion of the plastic optical fiber 2 is heated/melted and then the heated/melted portion is filled in the tapered concave portion 11b, but also the mirror surface 25Ca is transferred onto the end surface of the plastic optical fiber 2 and then the end surface can be finished as the smooth mirror surface. The timing for heating the thermally conductive working body 25c by the hot plate 21 may be set before or after the optical connector 10 is pushed down or may be set to the middle of the pushing down so as to fit the protection wall portion 16 into the inside of the guide portion 30.

After this, the heating by the heater 23 is stopped and then the refrigerant is supplied to the refrigerant passage 26C from the refrigerant inlet pipe 27a and then discharged from the refrigerant outlet pipe 27b to the outside. Thus, the thermally conductive working body 25C can be cooled.

Lastly, the optical connector 10 is removed from the hot plate 21 to stripe off the top end portion of the plastic optical fiber 2 from the mirror surface 25a of the thermally conductive working body 25C. Thus, the manufacture of the optical connector 10 in which the plastic optical fiber 2 is subjected to the end process at the top end portion of the ferrule portion 11 can be completed.

In this variation 2, following advantages can be achieved in addition to the advantages in the above embodiment.

In other words, since the refrigerant passage 26C through which the cooling medium can be passed is formed in the thermally conductive working body 25C, such thermally conductive working body 25C can be quickly cooled by pushing the top end portion of the plastic optical fiber 2 against the mirror surface 25Ca of the thermally conductive working body 25C and then passing the cooling medium through the refrigerant passage 26C. Therefore, the end process of the plastic optical fiber 2 can be executed with good precision in a short time.

Also, similar advantages to those explained in the variation 1 can be achieved by the guide portion 30 projected from the hot plate 21.

[Variation 3]

An optical fiber end processing method and an optical fiber end processing equipment 20D according to a variation 3 will be explained with reference to FIG. 14 to FIG. 16 hereunder.

In the optical fiber end processing equipment 20D according to the variation 3, in addition to the thermally conductive working body 25 explained in the above embodiment, the thermally conductive working body 25 that is formed as a laminated body of a plurality of thermally conductive plate members 28D, at least one surface side of which is worked as mirror surfaces 28Da, is employed. In this case, respective thermally conductive plate members 28D are laminated such that respective mirror surfaces 28Da are directed upward on the hot plate 21.

The thermally conductive plate members 28D are formed by an almost rectangular plate member such as metal, etc. having good thermal conductivity. At least one surface side is finished as the mirror surface 28Da by the polishing, the coating, etc. In the case that both surfaces of the thermally conductive plate members 28D are worked as the mirror surface 28Da, the thermally conductive plate members 28D are turned over and then reused when the mirror surface 28Da on one side used in the end process is polluted, as described later.

In this case, in the optical fiber end processing equipment 20D according to the present variation 3, elements except the above constituent elements are similar to the constituent elements in the above embodiment. Their explanation will be omitted by affixing the same symbols to these elements, or the like.

Also, in the optical fiber end processing equipment 20D according to the present variation 3, the guide portion 30 having the structure similar to that explained in the above variation 1 may be provided to project.

An optical fiber end processing method using the present optical fiber end processing equipment 20D will be explained with reference to FIG. 14 to FIG. 16 hereunder.

Figure 14:
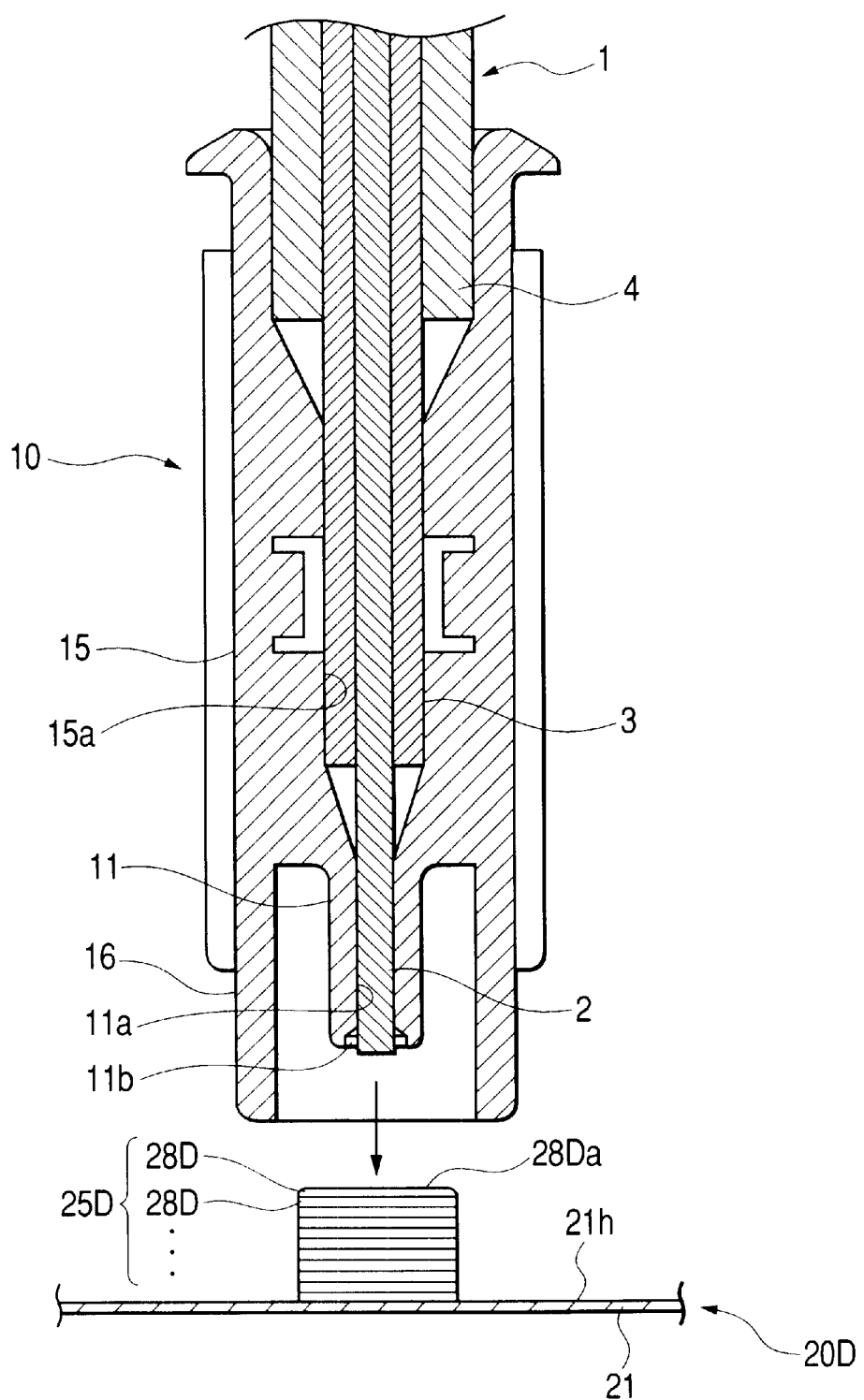
FIG. 14 is an enlarged pertinent portion sectional view showing one step of the optical fiber end process according to a variation 3.

First, as shown in FIG. 14, the optical fiber end processing equipment 20D having the thermally conductive working body 25D is prepared and also the plastic optical fiber 2 is inserted into the ferrule portion 11 to cause the top end portion to protrude. At this time, on the optical connector 10 side, the optical fiber cord 1 is positioned/held in the coated portion receiving hole portion 15a along its axis direction in the same way as the above embodiment.

Figure 15:
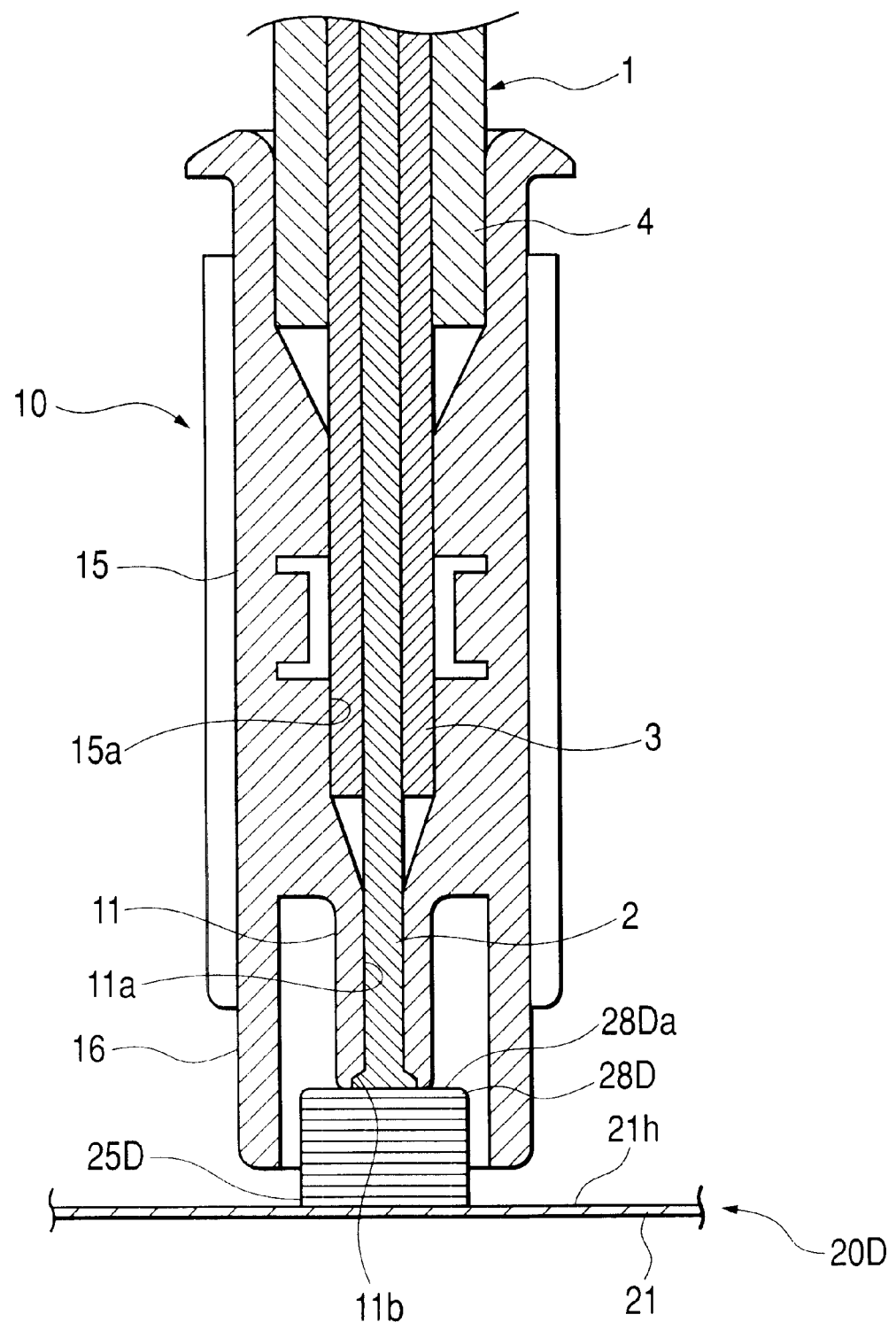
FIG. 15 is an enlarged pertinent portion sectional view showing another step of the optical fiber end process according to the variation 3.

Then, as shown in FIG. 15, if the optical connector 10 is pushed down while directing the top end portion of the ferrule portion 11 toward the thermally conductive working body 25D so as to insert the thermally conductive working body 25D into the protection wall portion 16, the top end portion of the plastic optical fiber 2 can be pushed against the mirror surface 28Da of the thermally conductive plate member 28D that is laminated/arranged on the uppermost surface of the thermally conductive working body 25D heated by the hot plate 21. At that time, not only the top end portion of the plastic optical fiber 2 is heated/melted and then the heated/melted portion is filled in the tapered concave portion 11b, but also the mirror surface 28Da is transferred onto the end surface of the plastic optical fiber 2 and thus the end surface can be finished as the smooth mirror surface. The timing for heating the thermally conductive working body 25D by the hot plate 21 maybe set before or after the optical connector 10 is pushed down or may be set to the middle of the pushing down so as to fit the thermally conductive working body 25D into the protection wall portion 16.

Figure 16:
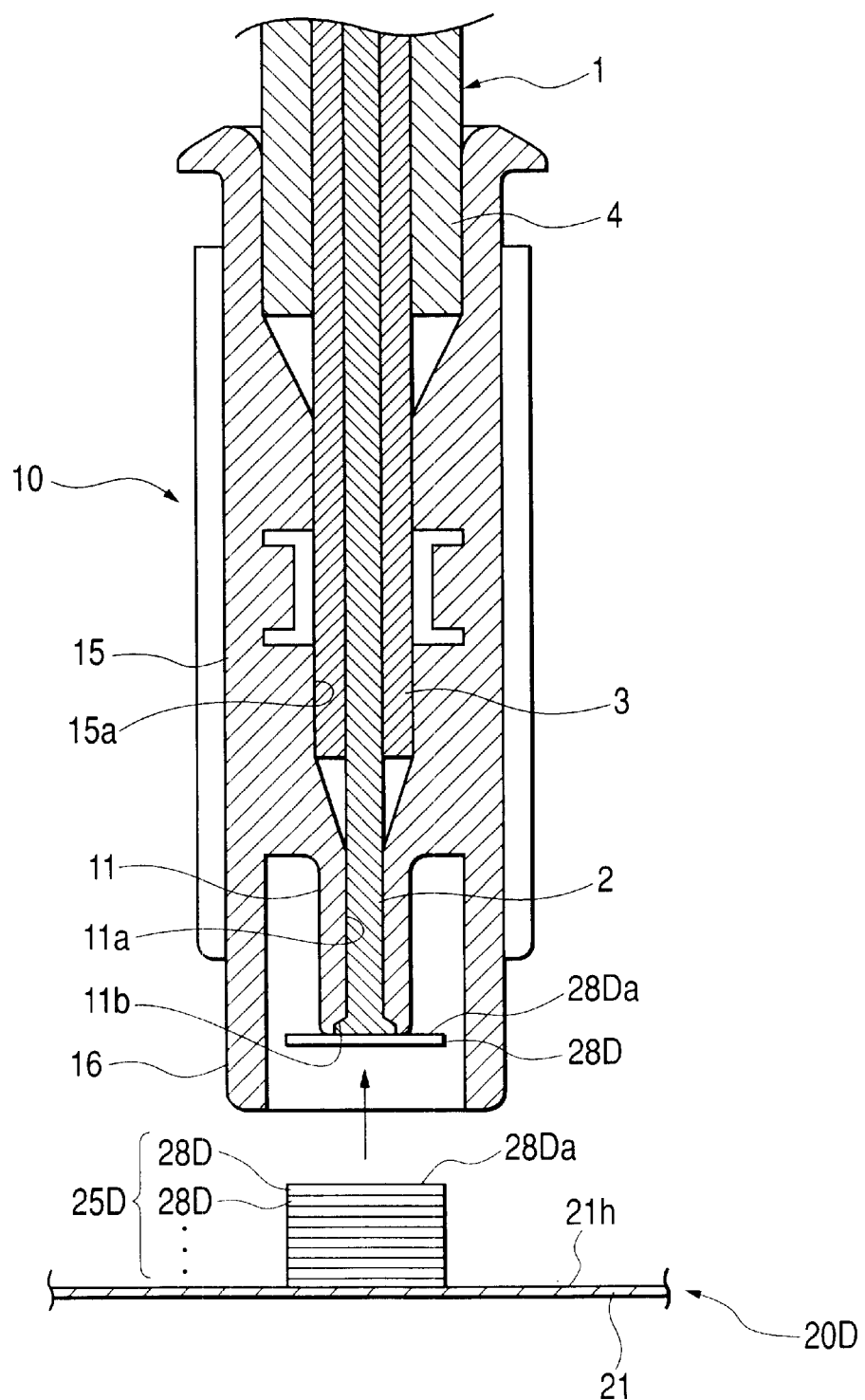
FIG. 16 is an enlarged pertinent portion sectional view showing still another step of the optical fiber end process according to the variation 3.

Then, as shown in FIG. 16, the overlying thermally conductive plate member 28D of the thermally conductive working body 25D can be separated from the underlying thermally conductive plate member 28D, by utilizing the adhesive force of the heated/melted top end portion of the plastic optical fiber 2 to the mirror surface 28Da of the thermally conductive plate member 28D that is laminated/arranged on the uppermost surface of the thermally conductive working body 25D. Then, the optical connector 10 as well as the overlying thermally conductive plate member 28D can be removed from the hot plate 21.

Then, the top end portion of the plastic optical fiber 2 protruded from the top end side of the ferrule portion 11 and the thermally conductive plate member 28D adhered to the top end portion are naturally cooled or forcedly cooled by the liquid nitrogen, the cooling air, etc., and then the thermally conductive plate member 28D is removed to peel off from the top end portion of the plastic optical fiber 2. Thus, the manufacture of the optical connector 10 in which the plastic optical fiber 2 is subjected to the end process at the top end portion of the ferrule portion 11 can be completed.

Here, the thermally conductive plate member 28D may be fitted to the top end portion of the plastic optical fiber 2 as it is until the optical connector 10 is actually used. In this case, the end surface of the plastic optical fiber 2 can be protected by the thermally conductive plate member 28D.

In addition, other thermally conductive plate member 28D still remains on the hot plate 21 in this state. Therefore, the end process of the plastic optical fiber 2 can be executed in other optical connector 10 like the above by the thermally conductive working body 25D consisting of the residual thermally conductive plate member 28D.

In this variation 3, following advantages can be achieved in addition to the advantages in the above embodiment.

In other words, the hot plate 21 and the thermally conductive working body 25D are formed as the separate bodies in the optical fiber end processing equipment 20D, and also the laminated body of a plurality of thermally conductive plate members 28D, at least one surface side of which is worked as the mirror surface 28Da, is employed as the thermally conductive working body 25D. Therefore, after the top end portion of the plastic optical fiber 2 is pushed against the mirror surface 28Da of the thermally conductive plate member 28D that is laminated/arranged on the uppermost surface of the thermally conductive working body 25D, the overlying thermally conductive plate member 28D of the thermally conductive working body 25D can be separated from the underlying thermally conductive plate member 28D, by utilizing the adhesive force of the heated/melted top end portion of the plastic optical fiber 2 to the mirror surface 28Da of the thermally conductive plate member 28D that is laminated/arranged on the uppermost surface of the thermally conductive working body 25D, not to wait until the top end portion of the plastic optical fiber 2 and the thermally conductive working body 25D are cooled, and then the optical connector 10 as well as the overlying thermally conductive plate member 28D can be removed from the hot plate 21. Then, since the end process of other plastic optical fiber 2 can be executed continuously and repeatedly by the thermally conductive working body 25D consisting of the thermally conductive plate member 28D remaining on the hot plate 21, the end process of a plurality of plastic optical fibers 2 can be effectively carried out.

As described above, according to the optical fiber end processing method set forth in the first to fourth aspects of the present invention, there is provided an optical fiber end processing method for an optical connector in which a ferrule portion for receiving/holding the end portion of the plastic optical fiber is formed integrally to protrude from the connector housing portion and also the almost cylindrical protection wall portion is formed integrally in the connector housing portion to extend to the top end side rather than the ferrule portion, which comprises the steps of preparing an optical fiber end processing equipment in which a thermally conductive working body is provided onto a heating surface of a hot plate to project therefrom and a projected surface of the thermally conductive working body is worked into a mirror surface; inserting the plastic optical fiber into the ferrule portion to cause its top end portion to protrude; and pushing the top end portion of the plastic optical fiber that is projected to the top end side of the ferrule portion against a mirror surface of the thermally conductive working body, which is heated by the hot plate, by inserting the thermally conductive working body into the protection wall portion of the optical connector. Therefore, the end process of the plastic optical fiber can be executed easily at the top end portion of the ferrule portion arranged at the position that is retreated in the protection wall portion of the connector housing portion.

In this case, according to the second aspect of the invention, the equipment in which the hot plate and the thermally conductive working body are formed separate bodies and the thermally conductive working body is loaded separably on the hot plate is prepared as the optical fiber end processing equipment, the top end portion of the plastic optical fiber is pushed against the mirror surface of the thermally conductive working body, and the optical connector together with the thermally conductive working body is removed from the hot plate by utilizing an adhesive force of the heated/melted top end portion of the plastic optical fiber to the mirror surface of the thermally conductive working body, and then the thermally conductive working body is removed from the top end portion of the plastic optical fiber after the top end portion of the plastic optical fiber, that is protruded from the top end side of the ferrule portion, and the thermally conductive working body are cooled. Therefore, the thermally conductive working body, etc. can be separated from the hot plate and quickly cooled, and also the end process of the plastic optical fiber can be executed with good precision in a short time.

Also, according to the third aspect of the invention, the equipment in which the hot plate and the thermally conductive working body are formed separate bodies and the thermally conductive working body is formed as the laminated body of a plurality of thermally conductive plate members, at least one surface side of which is worked as the mirror surface is prepared as the optical fiber end processing equipment, and the top end portion of the plastic optical fiber is pushed against the mirror surface of the thermally conductive plate member that is laminated/arranged on an uppermost surface of the thermally conductive working body, then the overlying thermally conductive plate member of the thermally conductive working body is separated from the underlying thermally conductive plate member, by utilizing an adhesive force of the heated/melted top end portion of the plastic optical fiber to the mirror surface of the thermally conductive plate member that is laminated/arranged on the uppermost surface of the thermally conductive working body, and then the optical connector as well as the overlying thermally conductive plate member is removed from the hot plate. Therefore, since the end process of other plastic optical fiber can be executed repeatedly like the above by the thermally conductive working body consisting of the thermally conductive plate member remaining on the hot plate, the end process of a plurality of plastic optical fibers can be effectively carried out.

In addition, according to the fourth aspect of the invention, the equipment in which the hot plate and the thermally conductive working body are formed integrally and the cooling mechanism for cooling the thermally conductive working body is incorporated into the thermally conductive working body is prepared as the optical fiber end processing equipment, and the top end portion of the plastic optical fiber is pushed against the mirror surface of the thermally conductive plate member that is laminated/arranged on an uppermost surface of the thermally conductive working body, then the thermally conductive working body is cooled by the cooling mechanism, and then the optical connector is removed from the hot plate by peeling off the top end portion of the plastic optical fiber from the mirror surface of the thermally conductive working body. Therefore, the thermally conductive working body, etc. can be quickly cooled by the cooling mechanism, and also the end process of the plastic optical fiber can be executed with good precision in a short time.

According to the optical fiber end processing equipment set forth in the fifth to eleventh aspects of the present invention, there is provided an optical fiber end processing equipment for an optical connector in which a ferrule portion for receiving/holding an end portion of a plastic optical fiber is formed integrally to protrude from a connector housing portion and also an almost cylindrical protection wall portion is formed integrally in the connector housing portion to extend to a top end side rather than the ferrule portion, which comprises a hot plate having a flat heating surface; and a thermally conductive working body which is projected on the hot plate and has a mirror surface that is formed to be inserted into a protection wall portion of the optical connector and can come into contact with a top end portion of the plastic optical fiber, that is projected to a top end side of the ferrule portion in the protection wall portion, in a state that the mirror surface is inserted into the protection wall portion. Therefore, if the thermally conductive working body is heated by the hot plate and then the top end portion of the plastic optical fiber, which is projected to the top end side of the ferrule portion, is pushed against the mirror surface of the thermally conductive working body by inserting the thermally conductive working body into the protection wall portion of the optical connector in the situation that the plastic optical fiber is inserted into the ferrule portion to cause its top end portion to protrude therefrom, the end process of the plastic optical fiber can be executed easily at the top end portion of the ferrule portion that is arranged at the position retreated in the protection wall portion of the connector housing portion.

In this case, according to the sixth aspect of the invention, the almost cylindrical guide portion, into the inside of which the protection wall portion is fitted and which guides the plastic optical fiber, that is installed/held in the ferrule portion, toward the mirror surface such that an axis direction of the plastic optical fiber is directed substantially perpendicular to the mirror surface of the thermally conductive working body is provided on the hot plate to protrude therefrom and to surround a position to which the thermally conductive working body provided. Therefore, since the plastic optical fiber can be guided precisely toward the mirror surface such that its axis direction is set substantially perpendicular to the mirror surface, the end process miss or variation in the optical properties at the end surface of the plastic optical fiber can be suppressed.

In this case, according to the seventh aspect of the invention, the thermally conductive working body is formed separately from the hot plate. Therefore, the thermally conductive working body, etc. can be separated from the hot plate and can be cooled quickly. Accordingly, the end process of the plastic optical fiber can be executed with good precision in a short time.

Also, according to the eighth aspect of the invention, the thermally conductive working body is formed to insert into the protection wall portion from at least two different directions and at least two mirror surfaces that comes into contact with the top end portion of the plastic optical fiber in respective insertion states are formed. Therefore, when the end process of the plastic optical fiber is being carried out by using any one predetermined mirror surface, the end process of the plastic optical fiber can be executed continuously by using the other mirror surface if the predetermined mirror surface is polluted, which is convenient.

Also, according to the ninth aspect of the invention, the thermally conductive working body is formed as the laminated body of a plurality of thermally conductive plate members at least one surface side of which is worked as the mirror surface. Therefore, after the top end portion of the plastic optical fiber is pushed against the mirror surface of the thermally conductive plate member that is laminated/arranged on the uppermost surface of the thermally conductive working body, the overlying thermally conductive plate member of the thermally conductive working body can be separated from the underlying thermally conductive plate member by utilizing the adhesive force of the heated/melted top end portion of the plastic optical fiber to the mirror surface of the thermally conductive plate member that is laminated/arranged on the uppermost surface of the thermally conductive working body, and then the optical connector as well as the overlying thermally conductive plate member can be removed from the hot plate. Then, since the end process of other plastic optical fiber can be executed repeatedly like the above by the thermally conductive working body consisting of the thermally conductive plate member remaining on the hot plate, the end process of a plurality of plastic optical fibers can be effectively carried out.

Also, according to the eleventh aspect of the invention, the refrigerant passage through which cooling medium can be passed is formed in the thermally conductive working body. Therefore, if the cooling medium is passed through the refrigerant passage after the top end portion of the plastic optical fiber is pushed against the mirror surface of the thermally conductive working body, the thermally conductive working body can be quickly cooled. As a result, the end process of the plastic optical fiber can be carried out with good precision in a short time.

What is claimed is:

1. An optical fiber end processing method for an optical connector in which a ferrule portion for receiving/holding an end portion of a plastic optical fiber is formed integrally to protrude from a connector housing portion and also an almost cylindrical protection wall portion is formed integrally in the connector housing portion to extend to a top end side rather than the ferrule portion, comprising the steps of:

preparing an optical fiber end processing equipment in which a thermally conductive working body is provided onto a heating surface of a hot plate to project therefrom and a projected surface of the thermally conductive working body is worked into a mirror surface;

inserting the plastic optical fiber into the ferrule portion to cause its top end portion to protrude; and pushing the top end portion of the plastic optical fiber that is projected to the top end side of the ferrule portion against a mirror surface of the thermally conductive working body, which is heated by the hot plate, by inserting the thermally conductive working body into the protection wall portion of the optical connector.

2. An optical fiber end processing method according to claim 1, wherein an equipment in which the hot plate and the thermally conductive working body are formed separate bodies and the thermally conductive working body is loaded separately on the hot plate is prepared as the optical fiber end processing equipment, the top end portion of the plastic optical fiber is pushed against the mirror surface of the thermally conductive working body, and the optical connector together with the thermally conductive working body is removed from the hot plate by utilizing an adhesive force of the heated/melted top end portion of the plastic optical fiber to the mirror surface of the thermally conductive working body, and then the thermally conductive working body is removed from the top end portion of the plastic optical fiber after the top end portion of the plastic optical fiber, that is protruded from the top end side of the ferrule portion, and the thermally conductive working body are cooled.

3. An optical fiber end processing method according to claim 1, wherein an equipment in which the hot plate and the thermally conductive working body are formed separate bodies and the thermally conductive working body is formed as a laminated body of a plurality of thermally conductive plate members, at least one surface side of which is worked as the mirror surface is prepared as the optical fiber end processing equipment, and the top end portion of the plastic optical fiber is pushed against the mirror surface of the thermally conductive plate member that is laminated/arranged on an uppermost surface of the thermally conductive working body, then an overlying thermally conductive plate member of the thermally conductive working body is separated from an underlying thermally conductive plate member, by utilizing an adhesive force of the heated/melted top end portion of the plastic optical fiber to the mirror surface of the thermally conductive plate member that is laminated/arranged on the uppermost surface of the thermally conductive working body, and then the optical connector as well as the overlying thermally conductive plate member is removed from the hot plate.

4. An optical fiber end processing method according to claim 1, wherein an equipment in which the hot plate and the thermally conductive working body are formed integrally and a cooling mechanism for cooling the thermally conductive working body is incorporated into the thermally conductive working body is prepared as the optical fiber end processing equipment, and the top end portion of the plastic optical fiber is pushed against the mirror surface of the thermally conductive plate member that is laminated/arranged on an uppermost surface of the thermally conductive working body, then the thermally conductive working body is cooled by the cooling mechanism, and then the optical connector is removed from the hot plate by peeling off the top end portion of the plastic optical fiber from the mirror surface of the thermally conductive working body.

5. An optical fiber end processing equipment for an optical connector in which a ferrule portion for receiving/holding an end portion of a plastic optical fiber is formed integrally to protrude from a connector housing portion and an almost cylindrical protection wall portion is formed integrally in the connector housing portion to extend to a top end side rather than the ferrule portion, comprising:

a hot plate having a flat heating surface; and a thermally conductive working body which is projected on the hot plate and has a mirror surface that is formed to be inserted into a protection wall portion of the optical connector and can come into contact with a top end portion of the plastic optical fiber, that is projected to a top end side of the ferrule portion in the protection wall portion, in a state that the mirror surface is inserted into the protection wall portion.

6. An optical fiber end processing equipment according to claim 5, wherein the thermally conductive working body is formed separately from the hot plate.

7. An optical fiber end processing equipment according to claim 6, wherein the thermally conductive working body is formed as a laminated body of a plurality of thermally conductive plate members at least one surface side of which is worked as the mirror surface.

8. An optical fiber end processing equipment according to claim 6, wherein the thermally conductive working body is formed to insert into the protection wall portion from at least two different directions and at least two mirror surfaces that comes into contact with the top end portion of the plastic optical fiber in respective insertion states are formed.

9. An optical fiber end processing equipment according to claim 5, wherein the thermally conductive working body is formed integrally with the hot plate.

10. An optical fiber end processing equipment according to claim 9, wherein a refrigerant passage through which cooling medium can be passed is formed in the thermally conductive working body.

11. An optical fiber end processing equipment according to claim 5, wherein an almost cylindrical guide portion, into an inside of which the protection wall portion is fitted and which guides the plastic optical fiber, that is installed/held in the ferrule portion, toward the mirror surface such that an axis direction of the plastic optical fiber is directed substantially perpendicular to the mirror surface of the thermally conductive working body is provided on the hot plate to protrude therefrom and to surround a position to which the thermally conductive working body provided.

* * * * *